US008208924B2

(12) United States Patent
Han et al.

(10) Patent No.: US 8,208,924 B2
(45) Date of Patent: Jun. 26, 2012

(54) METHOD AND SYSTEM FOR IMPROVING CALL DROP CAUSED BY RADIO LINK FAILURE IN MOBILE COMMUNICATION SYSTEM

(75) Inventors: Jung-Hee Han, Seoul (KR); Kyeong-In Jeong, Hwaseong-si (KR); Yong-Shin Cho, Seoul (KR); Hwa-Jin Cha, Seongnam-si (KR); Mi-Sun Do, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 12/724,989

(22) Filed: Mar. 16, 2010

(65) Prior Publication Data

US 2010/0234027 A1 Sep. 16, 2010

(30) Foreign Application Priority Data

Mar. 16, 2009 (KR) ........................ 10-2009-0022145

(51) Int. Cl.
*H04W 36/00* (2009.01)
(52) U.S. Cl. ................ 455/436; 455/423; 370/225
(58) Field of Classification Search .......... 455/423, 455/414; 370/225, 216, 332
See application file for complete search history.

(56) References Cited

U.S. PATENT DOCUMENTS

| 6,389,285 | B1 | 5/2002 | Escamilla et al. | |
|---|---|---|---|---|
| 2001/0018342 | A1* | 8/2001 | Vialen et al. | 455/423 |
| 2009/0046573 | A1 | 2/2009 | Damnjanovic | |
| 2010/0165836 | A1* | 7/2010 | Wahlqvist et al. | 370/225 |

FOREIGN PATENT DOCUMENTS

| KR | 10-0659935 B1 | 12/2006 |
|---|---|---|
| KR | 10-2008-0108780 A | 12/2008 |

* cited by examiner

*Primary Examiner* — Phuoc Doan
(74) *Attorney, Agent, or Firm* — Jefferson IP Law, LLP

(57) ABSTRACT

A method and system for improving a call drop caused by a Radio Link Failure (RLF) before handover triggering in a mobile communication system are provided. The method of improving the call drop caused by the RLF in the mobile communication system includes detecting an RLF occurring before handover triggering (RLF_before_HO), generating one of an RLF_before_HO-dependent statistics and an RLF_before_HO-dependent log file, transmitting the one of the RLF_before_HO-dependent statistics and the RLF_before_HO-dependent log file to a serving Base Station (BS), and updating a Neighbor Relation Table (NRT) and optimizing a handover parameter using the one of the RLF_before_HO-dependent statistics and the RLF_before_HO-dependent log file.

33 Claims, 6 Drawing Sheets

METHOD AND SYSTEM FOR IMPROVING CALL DROP CAUSED BY RADIO LINK FAILURE IN MOBILE COMMUNICATION SYSTEM

PRIORITY

This application claims the benefit under 35 U.S.C. §119(a) of a Korean patent application filed in the Korean Intellectual Property Office on Mar. 16, 2009 and assigned Serial No. 10-2009-0022145, the entire disclosure of which is hereby incorporated by reference.

BACKGROUND OF THE INVENTION

1. Field of the Invention

Aspects of the present invention relate to a handover in a mobile communication system. More particularly, aspects of the present invention relate to a method and system for improving a call drop caused by a Radio Link Failure (RLF) before handover triggering in a Long-Term Evolution (LTE) communication system.

2. Description of the Related Art

A method of deploying several small-sized multi-cells has been introduced to satisfy requirements of a high data rate and to reliably provide various services in a next generation network cellular system. Due to such advantages, research and standardization work on combining an existing macro-cell and a small-sized femto-cell are currently being conducted in, among others, the 3rd Generation Partnership Project (3GPP) and Institute of Electrical and Electronics Engineers (IEEE) 802.16 standards.

When managing a Base Station (BS), a Self-Organizing Network (SON) is used to configure a network in a more reliable and effective manner. In particular, as it becomes clear that mobile communication systems will employ a femto-cell and a next-generation communication technique, there is an increasing interest in SONs including an automation function, such as self-configuration or self-optimization. This is because cell planning and the like cannot be performed in advance, because nodes (such as the femto-cell) are not installed in an optimal position defined by a service provider. Rather, the nodes are installed by a user, and thus the nodes have to perform optimization by themselves by detecting an environment and gathering information.

Therefore, in an SON environment, an information exchange operation for having a relation with neighbor BSs, i.e., an Automatic Neighbor Relation (ANR) function, is generally necessary for an update process performed when a new BS is added and an old BS is released. The ANR function is basically performed using a User Equipment (UE).

FIG. 1 illustrates an exemplary scenario of a Radio Link Failure (RLF) before handover triggering (hereinafter, referred to as "RLF_before_HO") in a mobile communication system of the related art.

Referring to FIG. 1, an Element Management System (EMS)/SON server 100 performs network management, and controls an update process when a new BS (also referred to as an evolved Node-B (eNB)) is added and an old BS is released (such control is referred to as ANR function control).

An eNB A 110 is connected with a User Equipment (UE) 130 via a link 112. When the UE 130 moves to an eNB B 120 quickly, a link 116 between the eNB A 110 and the moved UE 130' is disconnected before handover triggering is generated, and the moved UE 130' intends to establish a link 118 by transmitting a Radio Resource Control (RRC) re-establish message to the eNB B 120.

In an SON environment, an Automatic Neighbor Relation (ANR) update function between eNBs may be necessary. An ANR configuration function detects a new neighbor cell using a UE measurement report and automatically adds a Neighbor Relation (NR). An ANR optimization function provides an NR addition/deletion function and a prioritization function based on a UE measurement result (e.g., signal strength of a neighbor eNB), a HandOver (HO) Key Performance Indicator (KPI) (e.g., handover attempt rate/success rate), and Radio Resource Management (RRM) information, and thus provides an optimal Neighbor Relation Table (NRT) management function in an automated manner.

As described above, when the UE measurement report is received, each eNB may be added to the NRT. However, in case of the RLF_before_HO, the link between the UE 130 and the serving eNB 110 is disconnected before the UE measurement report is received, and thus the serving eNB 110 cannot add the target eNB 120 to its NRT (in this case, the target eNB 120 is not included in the NRT of the old serving eNB 110). Further, since the RLF_before_HO is not recognized as an handover from the perspective of the serving eNB 110 (that is, the serving eNB 110 cannot know that the UE 130 unlinked from the eNB 110 attempts a handover to the target eNB 120), this case is not considered in the HO KPI, and is eventually not considered in determination of an NRT priority. As a result, the target eNB 120 may be deleted from the NRT of the serving eNB 110 (in this case, the target eNB 120 is included in the NRT of the old serving eNB 110).

FIG. 2 is a graph illustrating handover triggering according to the related art.

Referring to FIG. 2, received signal strength received by a UE from a serving eNB is indicated by 202, and received signal strength received by the UE from a target eNB is indicated by 204. Handover triggering is generated at an instant 210 at which the received signal strength received by the UE from the target eNB becomes greater than the received signal strength received by the UE from the serving eNB.

In practice, a hysteresis value (e.g., an offset value) is used to mitigate a handover ping-pong effect. As a result, the received signal strength received by the UE from the serving eNB is offset to a curve 212, and the received signal strength received by the UE from the target eNB is offset to a curve 214. Therefore, actual handover triggering is generated at an instant 220 at which the received signal strength received by the UE from the target BS becomes greater than the received signal strength received by the UE from the serving eNB.

Consequently, even if the UE exists in a handover area, the signal strength between the UE and the serving eNB becomes less than a signal strength threshold 200 at which an RLF occurs, and thus a link established between the UE and the serving eNB is disconnected at the instant 220 before handover triggering is generated.

In this case, a handover event triggering parameter (i.e., a handover triggering offset value based on the handover ping-pong effect, referred to as a Cell Individual Offset (CIO)) is incorrectly set, and thus a previous connection established to an eNB (e.g., the serving eNB) before the UE measurement report is received is disconnected. If the RLF occurs by late handover triggering caused by fast movement of the UE, the serving eNB should modify a handover parameter (i.e., the CIO) for the target eNB to handle this problem.

Accordingly, there is a need for a method and system for improving a call drop caused by a link failure before handover trigging in a mobile communication system.

SUMMARY OF THE INVENTION

An aspect of the present invention is to address at least the above-mentioned problems and/or disadvantages and to provide at least the advantages described below. Accordingly, an aspect of the present invention is to provide a method and system for improving a call drop when a handover occurs in a mobile communication system.

Another aspect of the present invention is to provide a method and system for updating an Automatic Neighbor Relation (ANR) by considering Radio Link Failure (RLF) before HandOver (HO) (RLF_before_HO) in a mobile communication system in a Self-Organizing Network (SON) environment.

Another aspect of the present invention is to provide a method and system for optimizing a handover triggering parameter by considering RLF_before_HO in a mobile communication system.

In accordance with an aspect of the present invention, a method of improving a call drop caused by a RLF in a mobile communication system is provided. The method includes detecting an RLF occurring before handover triggering (RLF_before_HO), generating one of an RLF_before_HO-dependent statistics and an RLF_before_HO-dependent log file, transmitting the one of the RLF_before_HO-dependent statistics and the RLF_before_HO-dependent log file to a serving Base Station (BS), and updating a Neighbor Relation Table (NRT) and optimizing a handover parameter using the one of the RLF_before_HO-dependent statistics and the RLF_before_HO-dependent log file.

In accordance with another aspect of the present invention, a system for improving a call drop caused by a RLF in a mobile communication system is provided. The system includes a target BS for detecting an RLF occurring before handover triggering (RLF_before_HO), for generating one of an RLF_before_HO-dependent statistics and an RLF_before_HO-dependent log file, and for transmitting the one of the RLF_before_HO-dependent statistics and the RLF_before_HO-dependent log file to a serving BS, and the serving BS for updating an NRT and optimizing a handover parameter using the one of the RLF_before_HO-dependent statistics and the RLF_before_HO-dependent log file.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

Detailed Description of Exemplary Embodiments

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a "serving Base Station (BS)" denotes a BS linked to a User Equipment (UE) before handover, and is also referred to as a serving cell and a source evolved Node-B (eNB) in the exemplary embodiments of the present invention. A "target BS" denotes a BS linked to the UE after handover, and is also referred to as a target cell and a target eNB in the exemplary embodiments of the present invention. As used herein, the terms "BS", "cell" and "eNB" have the same meaning and thus are used without distinction in the exemplary embodiments of the present invention.

Hereinafter, a method and system for improving a call drop caused by a Radio Link Failure (RLF) before HandOver (referred to as RLF_before_HO) in a mobile communication system will be described.

Embodiments of the present invention consider a case where a call drop occurs before a UE transmits a handover triggering measurement report to a serving BS, and thus the UE attempts to re-access the target BS in a situation where handover-ready state is not achieved in the target BS (i.e., a situation where information of the UE is not obtained from the serving BS). In this situation, even if the UE exists in a handover area, an event triggering parameter is incorrectly configured and thus a link is disconnected without transmitting the measurement report by the UE to the serving BS.

Figure 1:
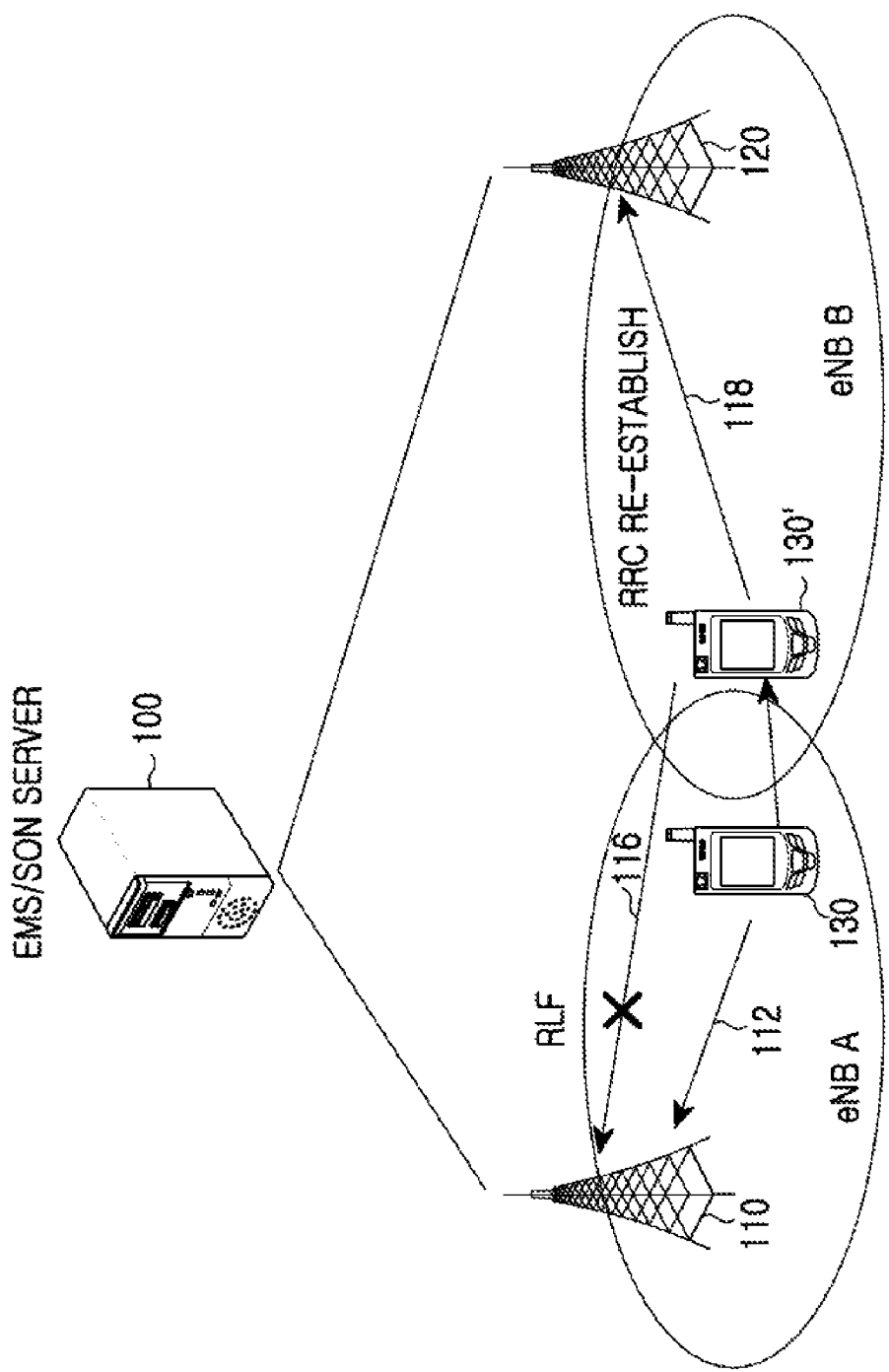
FIG. 1 illustrates an exemplary scenario of a Radio Link Failure (RLF) before handover triggering (hereinafter, referred to as "RLF_before_HO") in a mobile communication system of the related art.

When the UE no longer receives a signal due to the disconnected link, the UE attempts re-access. In this case, the UE is located in a signal area of the target BS instead of the serving BS, and thus transmits a re-access message to the target BS (see the description of FIG. 1 above).

Since BSs are frequently installed or released by a user in a Self-Organizing Network (SON) environment, an Automatic Neighbor Relation (ANR) function, which is an information exchange operation for having a relation between the BSs, may be necessary. In this case, the target BS may not be able to be added to a Neighbor Relation (NR) due to RLF_before_HO, or a priority may not be able to be applied for a previously added target BS and thus the target BS may be deleted from a Neighbor Relation Table (NRT) (hereinafter, referred to as a RLF_before_HO problem).

To solve the RLF_before_HO problem, exemplary embodiments of the present invention propose a process of: 1) by the target BS, detecting a call drop occurring due to handover triggering not considering RLF_before_HO; 2) by the target BS, generating an RLF_before_HO occurrence frequency into statistics or a log file and delivering the generated data to the serving BS; and 3) by the serving BS, performing handover optimization and updating an NRT using the generated data.

Figure 3:
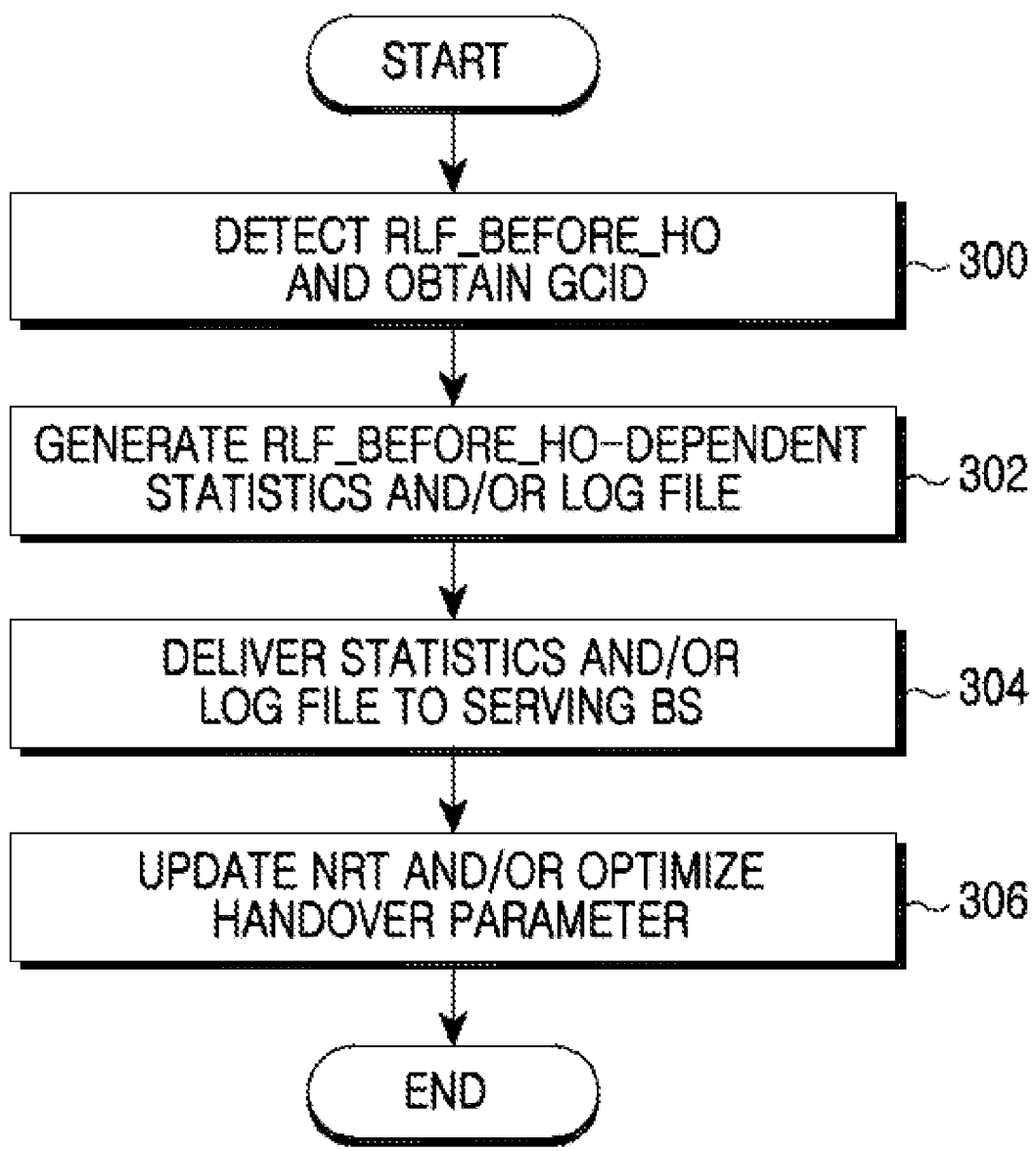
FIG. 3 is a flowchart illustrating an operation of a Base Station (BS) for improving a call drop caused by RLF_before_HO in a mobile communication system in a Self-Organizing Network (SON) environment according to an exemplary embodiment of the present invention.

FIG. 3 is a flowchart illustrating an operation of a BS for improving a call drop caused by RLF_before_HO in a mobile communication system in an SON environment according to an exemplary embodiment of the present invention.

Referring to FIG. 3, when a target BS receives a Radio Resource Control (RRC) re-establishment message from a specific UE in step 300, the target BS detects the RLF_before_HO by determining whether a Physical Cell IDentifier (PCID) and a Cell Radio Network Temporary Identifier (CRNTI) are included in the RRC re-establishment message. The target BS can know the RLF_before_HO caused by handover delay (i.e., delay of a handover triggering time due to fast movement of the UE) by identifying the PCID and CRNTI included in the RRC re-establishment message transmitted by the UE. The target BS then obtains a Global Cell ID (GCID) mapped to the PCID transmitted by the UE (regarding a process of obtaining the GCID, see the description of FIG. 4 and/or FIG. 5 below).

In step 302, the target BS generates RLF_before_HO-dependent statistics and/or log file based on the obtained GCID value. The target BS may configure the log file and/or the statistics based on information (e.g., the PCID and the CRNTI) transmitted from the UE and the GCID value of an associated serving BS. The RLF_before_HO may be recorded for each UE in a form of the log file, and the statistics may be gathered for each of the GCID and PCID of the serving BS. For example, the statistics may be defined/gathered as described below for each of the GCID and PCID of the serving BS.

An RLF_before_HO rate indicating an RLF_before_HO occurrence frequency for a neighbor cell i is defined by Equation (1) below.

$$P_{RLF\_before\_HO,i} = \frac{\text{number of RLF\_before\_HO from neighbor } C_i}{\text{Total number of HO from neighbor } C_i} \quad (1)$$

The RLF_before_HO rate is defined as a ratio of the number of RLF_before_HOs from the neighbor cell i to a total number of handovers from the neighbor cell i.

RLF_before_HO related HO problem statistics may be defined as shown in Table 1 below.

TABLE 1

| Neighbor | RLF_before_HO Rate |
|---|---|
| C1 | $P_{RLF\_before\_HO,1}$ |
| C2 | $P_{RLF\_before\_HO,2}$ |
| ... | ... |

As can be seen from Table 1, the statistics may be generated by obtaining the RLF_before_HO rate for each of the neighbor cell or the neighbor BS.

In step 304, the target BS transmits the generated RLF_before_HO-dependent statistics and/or log file to the serving BS. In this case, the target BS may transmit the statistics and/or the log file directly to the serving BS through an X2 interface (see the description of FIG. 6 below), or may transmit the statistics/log file to the serving BS via an Operation, Administration and Maintenance (OAM)/SON server (see the description of FIG. 7 below).

In step 306, the serving BS updates an NRT and/or a handover parameter using the RLF_before_HO-dependent statistics and/or log file. ANR optimization (i.e., NR addition/deletion, priority) is performed according to a normalized signal quality calculated for each neighbor cell based on a UE measurement result. A Time to Live (TTL: an effective time after NR addition) for each NR is defined and used to determine whether an NR is to be deleted together with the normalized signal quality for each neighbor cell. An NR is deleted if the TTL expires or if the normalized signal quality is less than or equal to a specific level or if a priority is low, so as not to maintain an unnecessary NR. In addition to the normalized signal quality for each neighbor cell, an NR prioritization function is performed by considering a Physical Resource Block (PRB) usage for each neighbor cell and a HO Key Performance Indicator (KPI) (i.e., an HO attempt/failure rate) for each cell. The PRB usage and the HO KPI may be obtained through an X2 interface.

NRT updating will be described for two cases: where the target BS is included in an old NRT of the serving BS, and where the target BS is not included in the old NRT of the serving BS.

When the target BS is included in the old NRT of the serving BS, as described above, RLF_before_HO occurs before the UE transmits a handover triggering measurement report to the serving BS, and thus the serving BS cannot know that a sort of "underlying" handover is performed (even if an RLF occurs). An ANR function calculates a weight (or a priority) for NRT addition/deletion based on the number of handover occurrences. However, the method according to the related art has a problem in that the "underlying" handover (such as the RLF_before_HO) is not considered in the NRT updating, and moreover, a handover to the target BS is less frequently successful and thus the target BS may be deleted from the NRT. As such, if the target BS is deleted from the NRT, a handover delay to a specific BS is increased (e.g., due to a need for GCID acquisition, X2 interface configuration, etc.). As a result, a call drop (i.e., an RLF) may occur. Therefore, according to exemplary embodiments of the present invention, to reduce a handover failure, a weight for NRT addition/deletion is increased by a pre-set value D for a specific target BS for which the RLF_before_HO occurs. Accordingly, a possibility that an associated target BS is deleted from the NRT is decreased, and consequently, a delayed handover to the target BS is prevented.

When the target BS is not included in the old NRT of the serving BS, an ANR triggers an NRT addition function so that the target BS is registered as a neighbor of a current serving BS. In this case, the NRT is configured using a GCID and PCID of an associated target BS for which the RLF_before_HO occurs. The GCID and the PCID are obtained from the target BS (or an Element Management System (EMS)/SON server).

Figure 2:
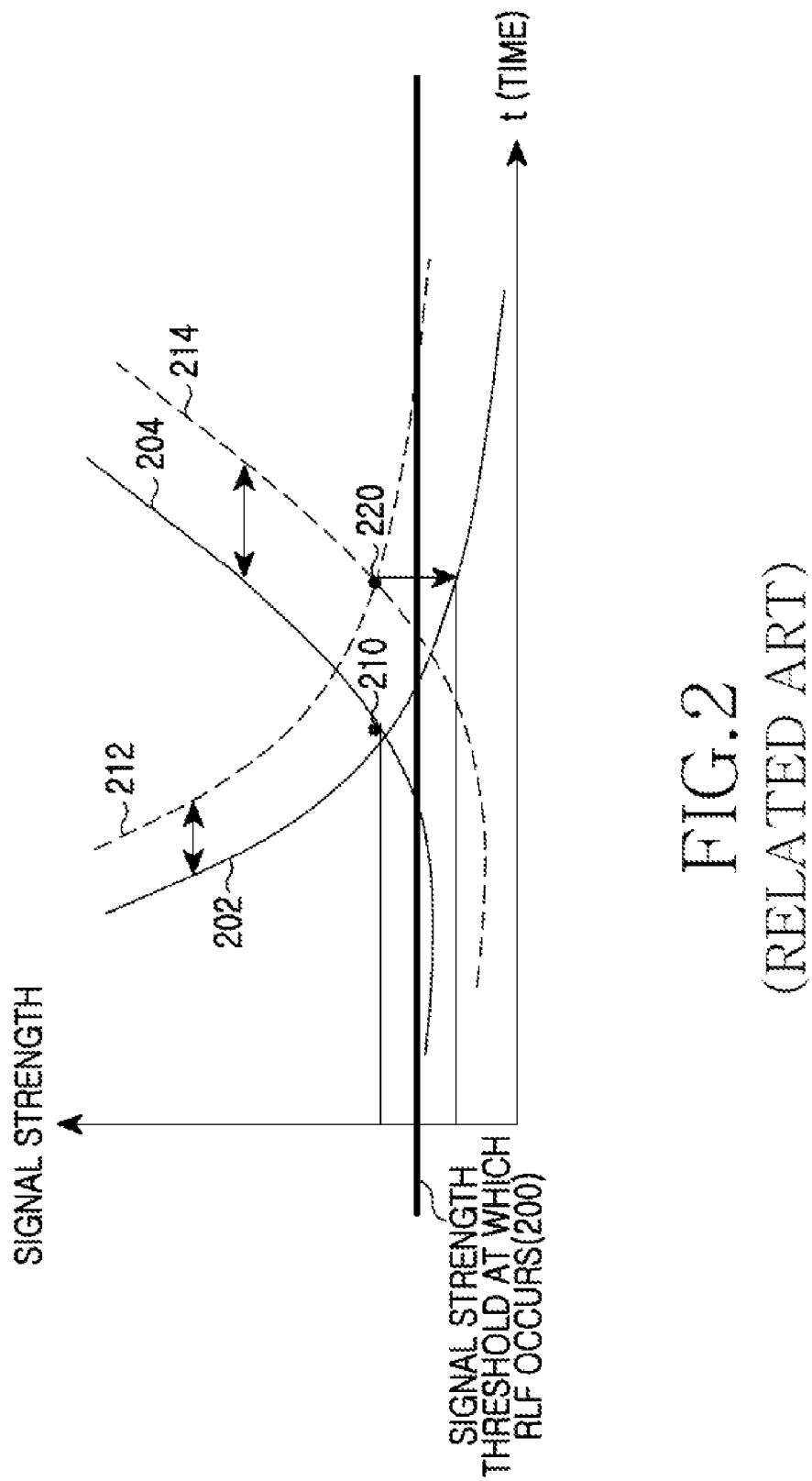
FIG. 2 is a graph illustrating conventional handover triggering.

If an RLF_before_HO occurrence rate is greater than or equal to a reference value with respect to a specific target BS, handover parameter optimization is regulated by increasing a Cell Individual Offset (CIO) value for a specific cell by a certain level so that a handover triggering time of FIG. 2 above occurs prior to an RLF occurrence time. That is, with respect to a target BS i, if $P_{RLF\_before\_HO,i} \leq Thresh_{RLF\_before\_HO}$ then, increase $CIO_i$ by $d_{RLF\_before\_HO}$.

Figure 4:
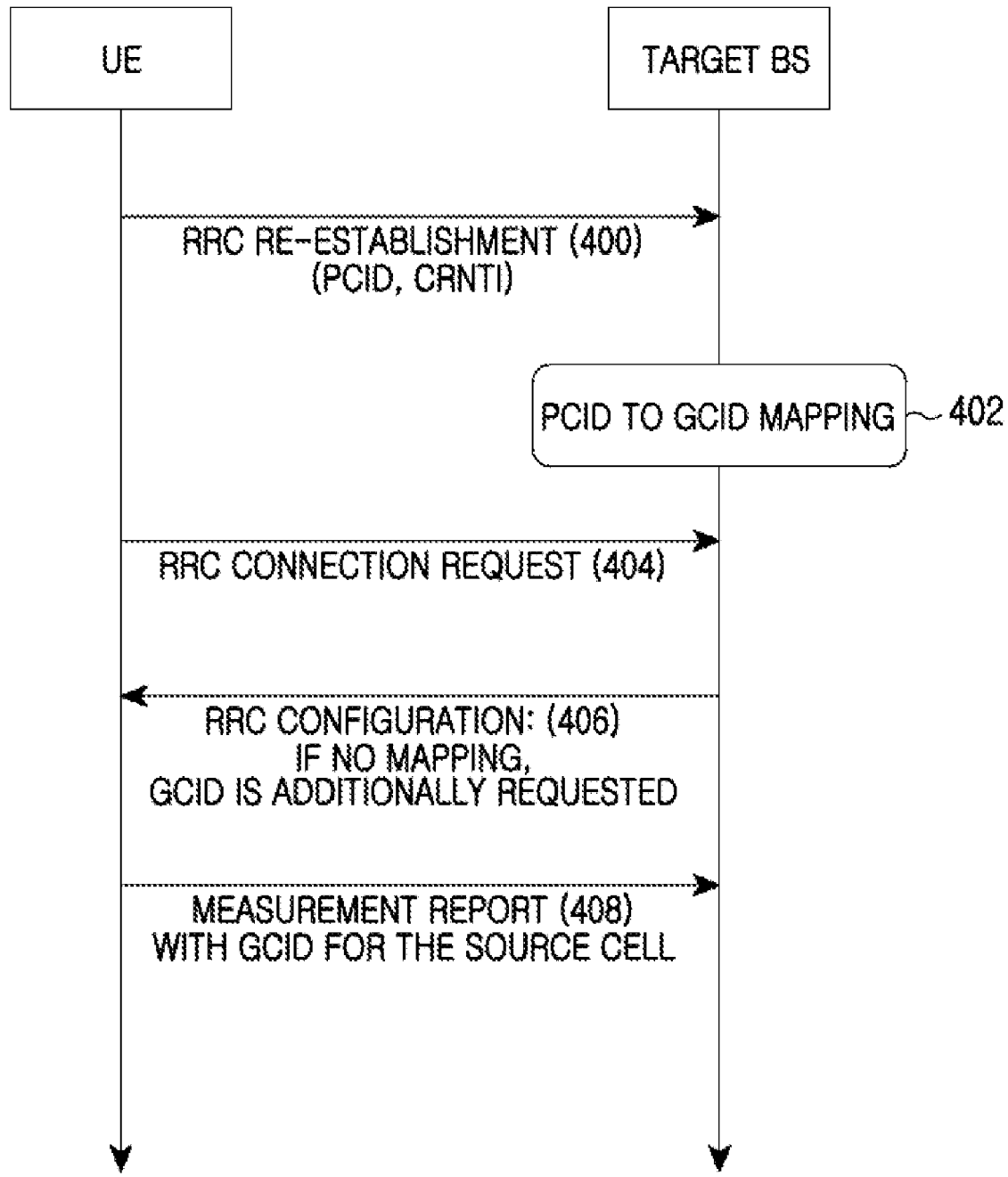
FIG. 4 is a flowchart illustrating a process of obtaining a Global Cell IDentifier (GCID) to be mapped to a Physical Cell ID (PCID) from a User Equipment (UE) according to an exemplary embodiment of the present invention.

FIG. 4 is a flowchart illustrating a process of obtaining a GCID to be mapped to a PCID from a UE according to an exemplary embodiment of the present invention.

Referring to FIG. 4, in step 400, the UE is unlinked from a serving BS before handover triggering, and transmits an RRC re-establishment message including a PCID and a CRNTI to a target BS. The RRC re-establishment message includes a PCID of a BS (i.e., the serving cell/serving BS) connected until up to that point and the CRNTI allocated from that cell.

In step 402, the target BS identifies the GCID to be mapped to the PCID received from the UE by searching an NRT of the target BS. Since an index used for the NRT is configured by combining the PCID and the GCID, the GCID to be mapped to the PCID received from the UE can be identified.

If there is no GCID to be mapped to the PCID of the serving BS (i.e., if an NRT for the PCID of the serving BS does not exist), the UE transmits an RRC connection request message to the target BS in step 404. In this case, to obtain a GCID of a specific serving BS having a specific PCID, the target BS transmits the RRC configuration message requesting the GCID of the serving cell to the UE in step 406. In step 408, the UE transmits a measurement report message including the GCID of the serving BS to the target BS.

Figure 5:
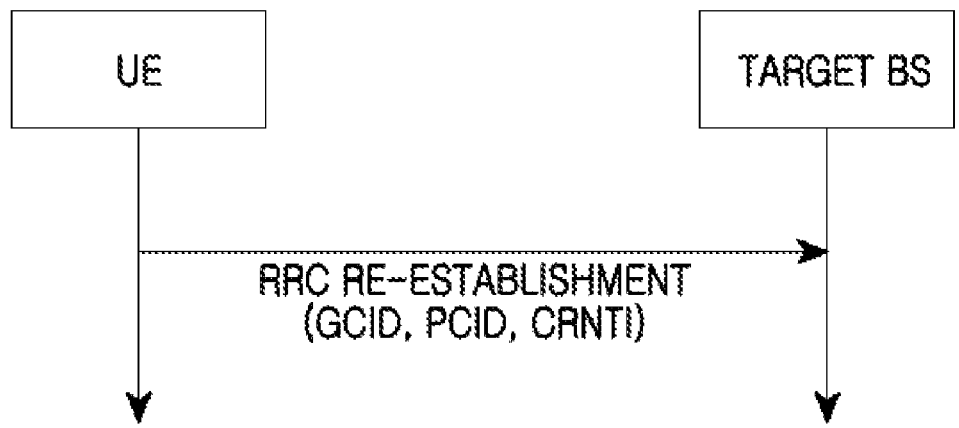
FIG. 5 illustrates a process of obtaining a GCID to be mapped to a PCID from a UE according to an exemplary embodiment of the present invention.

FIG. 5 illustrates a process of obtaining a GCID to be mapped to a PCID from a UE according to an exemplary embodiment of the present invention. The UE transmits an RRC re-establishment message to a target BS by including a PCID and a GCID to the RRC re-establishment message.

Figure 6:
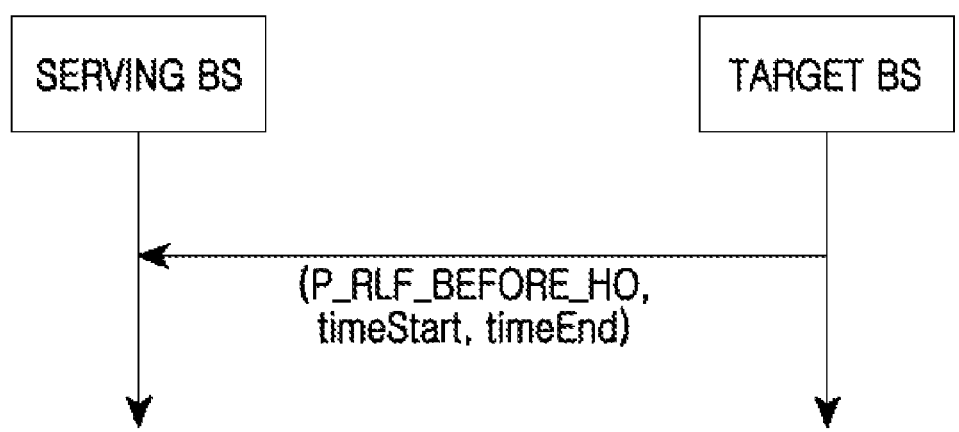
FIG. 6 illustrates a process of transmitting RLF_before_HO-dependent statistics and/or log file by a target BS to a serving BS according to an exemplary embodiment of the present invention.

FIG. 6 illustrates a process of transmitting RLF_before_HO-dependent statistics and/or log file by a target BS to a serving BS according to an exemplary embodiment of the present invention.

Referring to FIG. 6, the target BS transmits RLF_before_HO statistics gathered during a specific period to the serving BS through an X2 interface. The RLF_before_HO statistics includes P_RLF_before_HO_rate indicating how many times RLF_before_HO occurs, timeStart indicating a start time of gathering the statistics, and timeEnd indicating an end time of gathering the statistics. Optionally, GCID and PCID information of the target BS and/or the serving BS can be included in the RLF_before_HO statistics.

Figure 7:
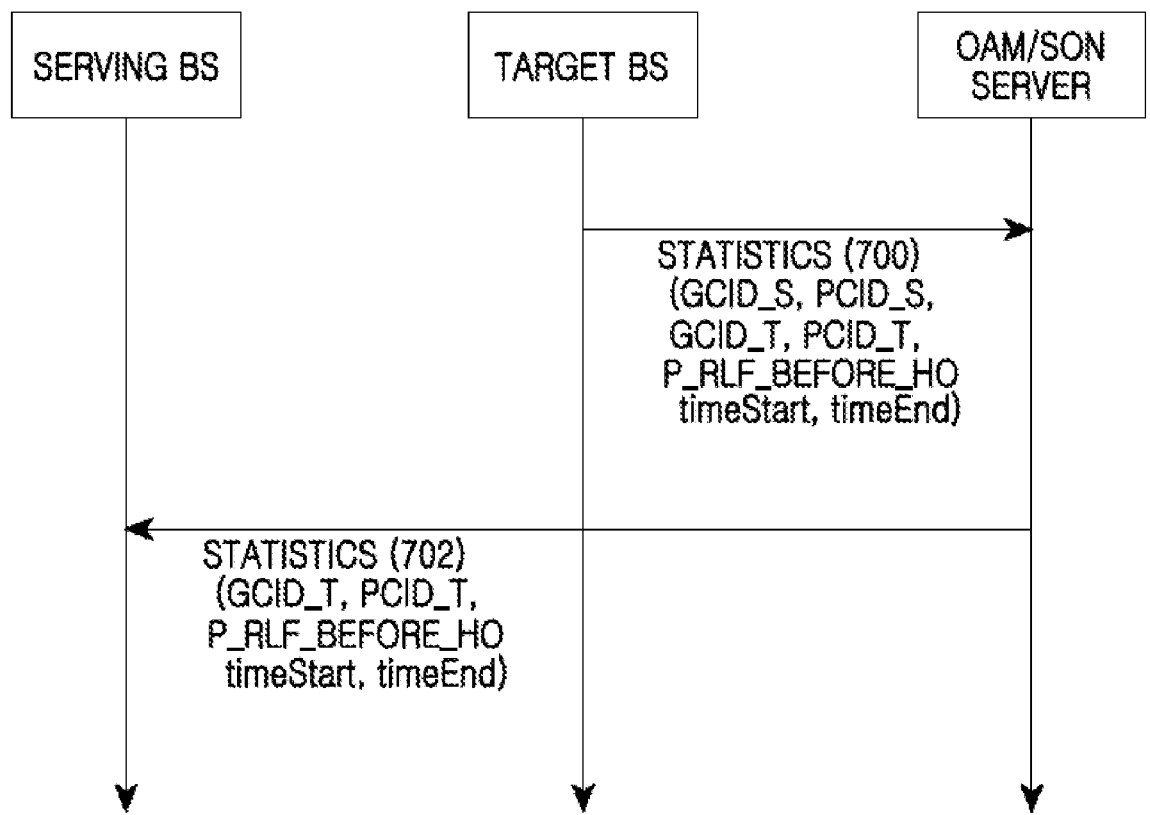
FIG. 7 illustrates a process of transmitting RLF_before_HO-dependent statistics and/or log file by a target BS to a serving BS according to an exemplary embodiment of the present invention.

FIG. 7 illustrates a process of transmitting RLF_before_HO-dependent statistics and/or log file by a target BS to a serving BS according to an exemplary embodiment of the present invention.

Referring to FIG. 7, in step 700, the target BS transmits RLF_before_HO statistics gathered during a specific period to an OAM/SON server. The RLF_before_HO statistics includes a P_RLF_before_HO rate indicating how many times RLF_before_HO has occurred, timeStart indicating a start time of gathering the statistics, timeEnd indicating an end time of gathering the statistics, a GCID and PCID of the serving BS, and a GCID and PCID of the target BS.

In step 702, the OAM/SON server transmits to the serving BS the RLF_before_HO statistics delivered from the target BS. In this case, the RLF_before_HO statistics includes a P_RLF_before_HO rate indicating how many times RLF_before_HO has occurred, timeStart indicating a start time of gathering the statistics, timeEnd indicating an end time of gathering the statistics, and a GCID and PCID of the target BS, and does not include a GCID and PCID of the serving BS.

According to exemplary embodiments of the present invention, when a UE attempts to access a new target BS, statistics and a log file are generated by detecting RLF_before_HO and are then transmitted to a serving BS. Therefore, an ANR can be updated by considering the RLF_before_HO, and a handover triggering parameter can be optimized by considering the RLF_before_HO. In addition, call drop performance can be improved by ANR updating and handover optimization.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of improving a call drop caused by a Radio Link Failure (RLF) in a mobile communication system, the method comprising:
    by a target Base Station (BS), detecting an RLF occurring before handover triggering (RLF_before_HO);
    by the target BS, generating one of an RLF_before_HO-dependent statistics and an RLF_before_HO-dependent log file;
    by the target BS, transmitting the one of the RLF_before_HO-dependent statistics and the RLF_before_HO-dependent log file to a serving BS; and
    by the serving BS, updating a Neighbor Relation Table (NRT) and optimizing a handover parameter using one of the RLF_before_HO-dependent statistics and the RLF_before_HO-dependent log file.

2. The method of claim 1, wherein the detecting of the RLF_before_HO comprises:
    determining one of a presence and an absence of Radio Resource Control (RRC) context information corresponding to a Physical Cell IDentifier (PCID) and Cell Radio Network Temporary Identifier (CRNTI) included in an RRC re-establishment request message received from a specific User Equipment (UE).

3. The method of claim 1, further comprising:
    obtaining a Global Cell ID (GCID) for generating the RLF_before_HO-dependent statistics.

4. The method of claim 3, wherein the obtaining of the GCID comprises:
    by the target BS, receiving an RRC re-establishment message comprising a PCID and a CRNTI from a specific user equipment (UE);
    by the target BS, identifying a GCID to be mapped to the received PCID by searching an NRT;
    if there is no GCID to be mapped to the PCID, transmitting an RRC configuration message for requesting the GCID of the serving BS to the specific UE; and
    receiving a measurement report message comprising the GCID for the serving BS from the specific UE.

5. The method of claim 3, wherein the obtaining of the GCID comprises:
    receiving the RRC re-establishment message comprising the PCID and the CRNTI from the specific UE.

6. The method of claim 1,
wherein the RLF_before_HO-dependent log file is a log file recorded for each UE, and
wherein the RLF_before_HO-dependent statistics indicates how many times the RLF_before_HO occurs for each neighbor BS and is determined by a ratio of the number of times of RLF_before_HO occurrences from a neighbor cell i to a total number of handovers from the neighbor cell i.

7. The method of claim 1, wherein the transmitting of the one of the RLF-dependent statistics and the RLF_before_HO-dependent log file comprises:
by the target BS, directly transmitting the RLF-dependent statistics gathered for a specific period to the serving BS through an X2 interface.

8. The method of claim 1, wherein the transmitting of one of the RLF_before_HO-dependent statistics and the RLF_before_HO-dependent log file comprises:
transmitting to a server the one of the RLF_before_HO-dependent statistics and the RLF_before_HO-dependent log file gathered for a specific period; and
transmitting, from the server to the serving BS, the one of the RLF_before_HO-dependent statistics and the RLF_before_HO-dependent log file transmitted to the server from the target BS.

9. The method of claim 1, wherein the updating of the NRT comprises:
increasing a weight for one of NRT addition and NRT deletion by a pre-set value for the target BS to reduce a handover failure if the target BS is included in an old NRT of the serving BS, and
adding the target BS to the NRT using a PCID and GCID of the target BS if the target BS is not included in the old NRT of the serving BS.

10. The method of claim 1, wherein the optimization of the handover parameter comprises:
if the RLF_before_HO occurs and an occurrence rate reconfigured to the target BS is greater than or equal to a reference value, increasing a handover triggering parameter by a specific level such that a handover triggering time occurs prior to an RLF occurrence time, the handover triggering parameter being a Cell Individual Offset (CIO) value.

11. The method of claim 1, further comprising:
determining, by the user equipment, that a handover from the serving BS to the target BS is necessary based on a handover triggering parameter of the target base station; and
performing a handover of the user equipment from the serving BS to the target BS;
wherein, if a Radio Link Failure (RLF) before Handover (HO) occurrence of the target BS is greater than or equal to a reference value, the handover triggering parameter of the target BS is adjusted based on the RLF before HO occurrence such that the performing of the handover occurs prior to an expected RLF with the serving BS.

12. The method of claim 11, wherein the performing of the handover comprises:
if a RLF failure occurs before the handover is initiated, transmitting to the target BS a Radio Resource Control (RRC) re-establishment message including a Physical Cell IDentifier (PCID) and a Cell Radio Network Temporary Identifier (CRNTI);
receiving, in response to the transmission of the RRC re-establishment message, an RRC configuration message from the serving BS, the RRC configuration message requesting a GCID of the serving BS; and
transmitting to the serving BS, in response to the RRC configuration message, a measurement report including the GCID of the serving BS.

13. A system for improving a call drop caused by a Radio Link Failure (RLF) in a mobile communication system, the system comprising:
a target Base Station (BS) for detecting an RLF occurring before handover triggering (RLF_before_HO), for generating one of an RLF_before_HO-dependent statistics and an RLF_before_HO-dependent log file, and for transmitting the one of the RLF_before_HO-dependent statistics and the RLF_before_HO-dependent log file to a serving BS; and
the serving BS for updating a Neighbor Relation Table (NRT) and optimizing a handover parameter using the one of the RLF_before_HO-dependent statistics and the RLF_before_HO-dependent log file.

14. The system of claim 13, wherein the target BS determines one of a presence and an absence of Radio Resource Control (RRC) context information corresponding to a Physical Cell IDentifier (PCID) and Cell Radio Network Temporary Identifier (CRNTI) included in an RRC re-establishment request message received from a specific User Equipment (UE).

15. The system of claim 13, wherein the target BS receives an RRC re-establishment message comprising a PCID and a CRNTI from a specific UE, identifies a Global Cell ID (GCID) to be mapped to the received PCID by searching an NRT if there is no GCID to be mapped to the PCID, transmits an RRC configuration message for requesting the GCID of the serving BS to the specific UE, and receives a measurement report message comprising the GCID for the serving BS from the specific UE.

16. The system of claim 13, wherein the target BS receives the RRC re-establishment message comprising the PCID and a GCID from the specific UE.

17. The system of claim 13,
wherein the RLF_before_HO-dependent log file is a log file recorded for each UE, and
wherein the RLF_before_HO-dependent statistics indicates how many times the RLF_before_HO occurs for each neighbor BS and is determined by a ratio of the number of times of RLF_before_HO occurrences from a neighbor cell i to a total number of handovers from the neighbor cell i.

18. The system of claim 13, wherein the target BS directly transmits the RLF-dependent statistics gathered for a specific period to the serving BS through an X2 interface.

19. The system of claim 13, wherein the target BS transmits to a server the one of the RLF_before_HO-dependent statistics and the RLF_before_HO-dependent log file gathered for a specific period, and transmits to the serving BS the RLF-dependent statistics or log file delivered to the server from the target BS.

20. The system of claim 13, wherein the serving BS updates the NRT by increasing a weight for NRT addition/deletion by a pre-set value for the target BS to reduce a handover failure if the target BS is included in an old NRT of the serving BS, and adding the target BS to the NRT by using a PCID and GCID of the target BS if the target BS is not included in the old NRT of the serving BS.

21. The system of claim 13, wherein, if the RLF_before_HO occurs and an occurrence rate reconfigured to the target BS is greater than or equal to a reference value, the optimization of the handover parameter increases a handover triggering parameter by a specific level so that a handover triggering time occurs prior to an RLF occurrence time, the handover triggering parameter being a Cell Individual Offset (CIO) value.

22. The system of claim 13, further comprising:
the user equipment for determining that a handover from the serving BS to the target BS is necessary based on a handover triggering parameter of the target base station; and
performing a handover of the user equipment from the serving BS to the target BS;
wherein, if a Radio Link Failure (RLF) before Handover (HO) occurrence of the target BS is greater than or equal to a reference value, the handover triggering parameter of the target BS is adjusted based on the RLF before HO occurrence such that the performing of the handover occurs prior to an expected RLF with the serving BS.

23. The system of claim 22, wherein the user equipment transmits to the target BS a Radio Resource Control (RRC) re-establishment message including a Physical Cell IDentifier (PCID) and a Cell Radio Network Temporary Identifier (CRNTI), if a RLF failure occurs before the handover is initiated, receives, in response to the transmission of the RRC re-establishment message, an RRC configuration message from the serving BS, the RRC configuration message requesting a GCID of the serving BS; and
the serving BS transmits, in response to the RRC configuration message, a measurement report including the GCID of the serving BS.

24. A method of operating a target Base Station (BS) for improving a call drop caused by a Radio Link Failure (RLF) in a mobile communication system, the method comprising:
detecting an RLF occurring before handover triggering (RLF_before_HO);
generating one of an RLF_before_HO-dependent statistics and an RLF_before_HO-dependent log file; and
transmitting the one of the RLF_before_HO-dependent statistics and the RLF_before_HO-dependent log file to a serving BS.

25. The method of claim 24, wherein the detecting of the RLF_before_HO comprises:
determining one of a presence and an absence of Radio Resource Control (RRC) context information corresponding to a Physical Cell IDentifier (PCID) and Cell Radio Network Temporary Identifier (CRNTI) included in an RRC re-establishment request message received from a specific User Equipment (UE).

26. The method of claim 24, further comprising:
obtaining a Global Cell ID (GCID) for generating the RLF_ before_HO-dependent statistics.

27. The method of claim 26, wherein the obtaining of the GCID comprises:
receiving an RRC re-establishment message comprising a PCID and a CRNTI from a specific UE;
identifying a GCID to be mapped to the received PCID by searching a Neighbor Relation Table (NRT);
if there is no GCID to be mapped to the PCID, transmitting an RRC configuration message for requesting the GCID of the serving BS to the specific UE; and
receiving a measurement report message comprising the GCID for the serving BS from the specific UE.

28. The method of claim 26, wherein the obtaining of the GCID comprises:
receiving the RRC re-establishment message comprising the PCID and the CRNTI from the specific UE.

29. The method of claim 24,
wherein the RLF_before_HO-dependent log file is a log file recorded for each UE, and
wherein the RLF_before_HO-dependent statistics indicates how many times the RLF_before_HO occurs for each neighbor BS and is determined by a ratio of the number of RLF_before_HO occurrences from a neighbor cell i to a total number of handovers from the neighbor cell i.

30. The method of claim 24, wherein the transmitting of the one of the RLF_before_HO-dependent statistics and the RLF_before_HO-dependent log file comprises:
directly transmitting, by the target BS, the RLF_before_HO-dependent statistics gathered for a specific period to the serving BS through an X2 interface, or
transmitting the one of the RLF_before_HO-dependent statistics and the RLF_before_HO-dependent log file gathered for a specific period to the serving BS via a server.

31. A method of operating a serving Base Station (BS) for improving a call drop caused by a Radio Link Failure (RLF) in a mobile communication system, the method comprising:
receiving one of an RLF_before_HO-dependent statistics and an RLF_before_HO-dependent log file from a target BS; and
updating a Neighbor Relation Table (NRT) and optimizing a handover parameter by using the one of the RLF_before_HO-dependent statistics and the RLF_before_HO-dependent log file.

32. The method of claim 31, wherein the updating of the NRT comprises:
increasing a weight for NRT addition/deletion by a pre-set value for the target BS to reduce a handover failure if the target BS is included in an old NRT of the serving BS; and
adding the target BS to the NRT by using a Physical Cell ID (PCID) and Global Cell ID (GCID) of the target BS if the target BS is not included in the old NRT of the serving BS.

33. The method of claim 31, wherein the optimization of the handover parameter comprises:
if the RLF_before_HO occurs and an occurrence rate reconfigured to the target BS is greater than or equal to a reference value, increasing a handover triggering parameter (i.e., a Cell Individual Offset (CIO) value) by a specific level so that a handover triggering time occurs prior to an RLF occurrence time.

* * * * *